US011456843B2

(12) United States Patent
Ratasuk et al.

(10) Patent No.: US 11,456,843 B2
(45) Date of Patent: Sep. 27, 2022

(54) RESOURCE ALLOCATION METHOD FOR SUB-PRB UPLINK TRANSMISSION (71) Applicant: Nokia Technologies Oy, Espoo (FI)

(72) Inventors: Rapeepat Ratasuk, Inverness, IL (US); Chunhai Yao, Beijing (CN); Nitin Mangalvedhe, Hoffman Estates, IL (US); David Bhatoolaul, Swindon (GB)

(73) Assignee: Nokia Technologies Oy, Espoo (FI)

( * ) Notice: Subject to any disclaimer, the term of this patent is extended or adjusted under 35 U.S.C. 154(b) by 25 days.

(21) Appl. No.: 16/764,975

(22) PCT Filed: Nov. 17, 2017

(86) PCT No.: PCT/CN2017/111741
§ 371 (c)(1),
(2) Date: May 18, 2020

(87) PCT Pub. No.: WO2019/095324
PCT Pub. Date: May 23, 2019

(65) Prior Publication Data
US 2020/0403760 A1 Dec. 24, 2020

(51) Int. Cl.
*H04L 5/00* (2006.01)
(52) U.S. Cl.
CPC .......... *H04L 5/0094* (2013.01); *H04L 5/0005* (2013.01); *H04L 5/0044* (2013.01)
(58) Field of Classification Search
CPC ... H04L 5/0094; H04L 5/0005; H04L 5/0044; H04L 5/0007; H04L 5/0092
See application file for complete search history.

(56) References Cited

U.S. PATENT DOCUMENTS

2013/0100925 A1* 4/2013 Ahn ...................... H04L 5/0098
370/329
2015/0289144 A1* 10/2015 Yi ......................... H04W 72/042
370/252

(Continued)

FOREIGN PATENT DOCUMENTS

CN 107005297 A 8/2017
CN 107197521 A 9/2017

OTHER PUBLICATIONS

"Increased PUSCH spectral efficiency", 3GPP TSG-RAN WG1 #90bis, R1-1718138, Agenda : 6.2.5.6, Qualcomm Incorporated, Oct. 9-13, 2017, pp. 1-4.

(Continued)

*Primary Examiner* — Asghar H Bilgrami
(74) *Attorney, Agent, or Firm* — Harrington & Smith (57) ABSTRACT A method, an apparatus, and a computer program product to support sub-PRB allocation on the Physical Uplink Shared Channel in a wireless communications system, a new resource allocation method is described, where available physical resource blocks (PRBs) in each subframe or narrowband are reorganized into a number of sub-PRBs, which would apply to user equipment in both in CE Mode A and CE Mode B while also supporting sub-PRB allocation in Msg3 as part of early data transmission during random access, so that a user equipment, which is previously configured for using physical uplink shared channel sub-PRB resources, upon receiving an indication, will then use or determine whether to use a sub-PRB resource allocation based on the received indication.

15 Claims, 5 Drawing Sheets

(56) References Cited

U.S. PATENT DOCUMENTS

| | | | |
|---|---|---|---|
| 2017/0134129 A1* | 5/2017 | You | H04L 5/0051 |
| 2020/0068608 A1* | 2/2020 | Ye | H04W 72/048 |
| 2020/0280406 A1* | 9/2020 | Medina Acosta | H04L 5/0044 |

OTHER PUBLICATIONS

"Detailed sub-PRB allocation design for MTC", 3GPP TSG RAN WG1 Meeting #90bis, R1-1717199, Agenda : 6.2.5.6, ZTE, Oct. 9-13, 2017, 6 pages.

"[Draft] Design of PUSCH Sub-PRB Allocation", 3GPP TSG RAN WG1 Meeting #91, R1-17xxxxx, Agenda : 6.2.5.6, Nokia, Nokia Shanghai Bell, Nov. 27-Dec. 1, 2017, 5 pages.

"Design of PUSCH Sub-PRB Allocation", 3GPP TSG RAN WG1 Meeting #90bis, R1-1717225, Agenda : 6.2.5.6, Nokia, Nokia Shanghai Bell, Oct. 9-13, 2017, 4 pages.

"3rd Generation Partnership Project; Technical Specification Group GSM/EDGE Radio Access Network; Cellular system support for ultra-low complexity and low throughput Internet of Things (CIoT) (Release 13)", 3GPP TR 45.820, V13.1.0, Nov. 2015, pp. 1-495.

International Search Report and Written Opinion received for corresponding Patent Cooperation Treaty Application No. PCT/CN2017/111741, dated Aug. 10, 2018, 11 pages.

"Sub-PRB allocation for MTC PUSCH", 3GPP TSG RAN WG1 Meeting #90bis, R1-1717215, Agenda : 6.2.5.6, Sharp, Oct. 9-13, 2017, pp. 1-3.

"Sub-PRB Design Analysis", 3GPP TSG RAN WG1 Meeting #90, R1-1717762, Agenda : 6.2.5.6, Sierra Wireless, Oct. 9-13, 2017, 6 pages.

Extended European Search Report received for corresponding European Patent Application No. 17931864.7, dated Sep. 30, 2021, 11 pages.

"On PUSCH spectral efficiency enhancement", 3GPP TSG RAN WG1 Meeting #90bis, R1-1716972, Agenda : 6.2.5.6, Huawei, Oct. 9-13, 2017, 4 pages.

"PUSCH spectral efficiency improvement for MTC", 3GPP TSG RAN WG1 Meeting #90, R1-1713008, Agenda : 5.2.6.5, ZTE, Aug. 21-25, 2017, 6 pages.

* cited by examiner

FIG. 1

| Value of 6 LSB bits (L) | Subcarrier assignment within narrowband |
|---|---|
| 0, ..., 23 | {3*L, 3*L+1, 3*L+2} |
| 24, ..., 35 | {6*(L-24), 6*(L-24)+1, ..., 6*(L-24)+5} |

FIG. 2A

Table of Sub-PRB resource allocation within NB (6 bits)

| Value of 5 LSB bits (L) | Subcarrier assignment within narrowband |
|---|---|
| 0, ..., 23 | {3*L, 3*L+1, 3*L+2} |
| 24, ..., 31 | {6*(L-24), 6*(L-24)+1, ..., 6*(L-24)+5} + PRBoffset |

FIG. 2B

Sub-PRB resource allocation within NB with PRBoffset (5 bits)

| Value of 3 LSB bits (L) | Subcarrier assignment within PRB |
|---|---|
| 0, ..., 3 | {3*L, 3*L+1, 3*L+2} |
| 4, 5 | {6*(L-4), 6*(L-4)+1, ..., 6*(L-4)+5} |

FIG. 3A

Sub-PRB Resource Allocation for CE ModeB (3 bits)

FIG. 3B

Sub-PRB resource allocation in CE Mode B

| Value of 4 LSB bits (L) | Subcarrier assignment within narrowband |
|---|---|
| 0, ..., 5 | {12*L, 12*L+1,..., 12*L+12} |
| 6, 7 | {24*(L-6), 24*(L-6)+1, ..., 24*(L-6)+23} |
| 8, ...,13 | {3*(L-8), 3*(L-8)+1, 3*(L-8)+2} |
| 14, 15 | {6*(L-14), 6*(L-14)+1, ..., 6*(L-14)+5} |

FIG. 4

Sub-PRB Resource Allocation for CE ModeB (4 bits)

500

502
Configuring a UE to use physical uplink shared channel sub-PRB resources such that available PRBs in each subframe or narrowband are reorganized into a number of sub-PRBs

504
Have the UE receive a signal comprising an indication

506
Based on and in response to the received indication, the UE is adapted to determine to whether to use a sub-PRB resource allocation

FIG. 5

RESOURCE ALLOCATION METHOD FOR SUB-PRB UPLINK TRANSMISSION

RELATED APPLICATION

This application claims priority to PCT Application No. PCT/CN2017/111741, filed on Nov. 17, 2017, which is incorporated herein by reference in its entirety.

TECHNICAL FIELD

This invention relates generally to wireless communication systems related to Radio Standards (PHY/MAC/RLC/RRC of Any Radio that are Standard Related) and, more specifically, resource allocation for sub-physical-resource-block uplink transmission.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

In RAN1#90, it was agreed to support sub-PRB allocation (i.e. allocation of less than 1 PRB, e.g. 3 subcarriers or 6 subcarriers) on the PUSCH for eMTC. In RAN1#90bis, the following points were also agreed to:

Sub-PRB shall be supported at least in CE Mode B

Working assumption: Sub-PRB shall be supported in CE Mode A. RAN1 will prioritize optimization of Sub-PRB for CE Mode B over optimization of Sub-PRB for CE Mode A.

For Sub-PRB, the maximum total number of (valid) subframes of transmission is: 32 subframes for CE Mode A; 2048 subframes for CE Mode B FFS: Supported transport block sizes and numbers of repetitions (for each supported CE Mode)

Sub-PRB rate matching is performed across a resource unit (RU) spanning multiple subframes. The RU length depends on number of subcarriers in the Sub-PRB allocation. FFS: RE mapping. FFS: whether more than one RU is allocated per transport block.

For Sub-PRB, increasing DMRS shall not be supported

For Sub-PRB allocation in connected mode, the Sub-PRB feature is configured/enabled by RRC signaling and the Sub-PRB resource allocation shall be signaled by DCI.

FFS: Support of Sub-PRB allocation in Msg3.

When the Sub-PRB feature is configured/enabled in connected mode in CE mode B, then DCI format 6-0B shall support both sub-PRB allocation and allocation of at least 1 PRB. Sub-PRB allocation shall support a maximum TBS of at least [504] bits.

Previous writing that may be useful as background to the current invention may include the following: R1-1718138, "Increased PUSCH spectral efficiency," Qualcomm Incorporated; R1-1717199, "Detailed sub-PRB allocation design for MTC," ZTE, SaneChips; and R1-1717225, "Design of PUSCH Sub-PRB Allocation," Nokia, Nokia Shanghai Bell, RAN1#90bis, Prague, Czech Republic.

The current invention moves beyond these techniques.

Abbreviations that may be found in the specification and/or the drawing figures are either defined in the text or defined below in the following list of abbreviations:

2G Second Generation
3G Third Generation
3GPP Third Generation Partnership Project
5G Fifth Generation
5G-NB Fifth Generation Node B
BS Base Station
CB Contention Based
CE Control Element
CE Mode A Coverage Enhancement Mode A
CE Mode B Coverage Enhancement Mode B
CQI Channel Quality Indicator
CRC Cyclic Redundancy Check
CSI Channel State Information
C-RNTI Cell Radio Network Temporary Identifier
dBm Decibel-milliwatts
DCI Downlink Control Information
DL Downlink
eMTC enhanced Machine Type Communication
eNB or eNodeB Evolved Node B (LTE base station)
EPDCCH Enhanced Physical Downlink Control Channel
E-UTRAN Evolved UTRAN
FFS For Further Study
gNB NR/5G Node B
ID Identification
ITBS Transport Block Size Indices
L1 Physical Layer, also denoted PHY
LCID Logical Channel Identifier
LTE Long Term Evolution
LTE-A Long Term Evolution—Advanced
LTE-M LTE system to support MTC or M2M
LSB Least Significant Bit
Node B (NB) Node B (base station in UTRAN)
M2M Machine-to-Machine
MAC Medium Access Control
MAC CE MAC Control Element
MIMO Multiple In, Multiple Out
MTC Machine Type Communication
ms millisecond(s)
MSB Most Significant Bit
Msg3 During RACH procedure, UE Identification Message sent by UE to eNB
NACK Not Acknowledged/Negative-acknowledgement
NB Narrowband
NB-IoT Narrowband-Internet of Things
PCID Physical Cell Identity
PHY Physical Layer
PRB Physical Resource Block
RAN1 Radio layer 1
RA-RNTI Random Access Radio Network Temporary Identifier
PDCP Packet Data Convergence Protocol
PDSCH Physical Downlink Shared Channel
PDCCH Physical Downlink Control Channel
PDU Protocol Data Unit
PHR Power Headroom Report
PRACH Physical Random Access Channel
PRB Physical Resource Block
PUCCH Physical Uplink Control Channel
PUSCH Physical Uplink Shared Channel
QoS Quality of Service
RACH Random Access Channel
RAN Radio Access Network
RAR Random Access Response
RA-RNTI Random Access Radio Network Temporary Identifier
RAT Resource Allocation Type
RBI Refinement Beam Index RE Resource Element
Rel Release
ReTx Retransmission or retransmitting
RLC Radio link control
RRC Radio Resource Control
Rx, RX Reception or receiving
RU Resource Utilization/Resource Unit(s)
SB Sweeping Block
SIB System Information Block
SPS Semi-persistent scheduling
SR Scheduling Request
SRS Sounding Reference Signal
Sub-PRB Sub-Physical Resource Block
TBS Transport Block Size
TRP Transmit-Receive Point
TS Technical Specification or Technical Standard
Tx, TX Transmission or transmitting
TXRU Transceiver Unit
UCI Uplink Control Information
UE User Equipment or mobile station
UL Uplink
UL-SCH Uplink Shared Channel

BRIEF SUMMARY

This section is intended to include examples and is not intended to be limiting. As discussed in detail below, the current invention provides a novel and efficient way to allocate resources allocation for sub-PRB uplink transmission.

Specifically, to support sub-PRB allocation on the PUSCH, a new resource allocation method is needed. It was agreed in RAN1#90bis that DCI shall support both sub-PRB allocation and allocation of at least 1 PRB. It is desirable to have a resource allocation method that will do the following:

Support sub-PRB as well as Rel-14 PRB-based allocation to support full backward compatibility and avoid RRC reconfiguration between sub-PRB and PRB-based resource allocation modes. Sub-PRB allocation is an allocation in the frequency domain that is smaller than a PRB. For example, in LTE, a PRB comprises 12 subcarriers, and a sub-PRB allocation is an allocation smaller than 12 subcarriers (e.g. 6 subcarriers). Sub-PRB could also be thought of as a fraction of a PRB. For instance, in LTE, PRB has 12 subcarriers and we can only assign resource in multiple of PRBs. Thus, a sub-PRB could mean a resource that is a fraction of a PRB (e.g. 3 subcarriers)
   Apply to both UEs in CE Mode A versus CE Mode B where UEs in CE Mode A can support 1.4/5/20 MHz while UEs in CE Mode B can only support 1.4 MHz.
   Potentially support sub-PRB allocation in Msg3 as part of e.g. early data transmission during random access.

It is proffered that this new resource allocation method requires as little increase in scheduling grant size as possible (preferably an increase of no more than 1-2 bits).

An example of an embodiment of the current invention is a method that comprises receiving by a user equipment in a wireless communications system an indication, wherein the user equipment was previously configured for using physical uplink shared channel sub-PRB resources such that available PRBs in each subframe or narrowband are reorganized into a number of sub-PRBs (i.e. a number of subcarrier groups, each group smaller than a PRB which has 12 subcarriers); and determining by the UE whether to use sub-PRB resource allocation based on the received indication.

An example of another embodiment of the present invention is an apparatus that comprises at least one processor and at least one memory including computer program code, where the at least one memory and the computer program code are configured, with the at least one processor, to cause the apparatus to perform at least the following: receiving an indication, wherein the apparatus was previously configured for using physical uplink shared channel sub-PRB resources such that available PRBs in each subframe or narrowband are reorganized into a number of sub-PRBs; determining whether to use sub-PRB resource allocation based on the received indication.

An example of an additional embodiment of the instant invention is a computer program product embodied on a non-transitory computer-readable medium in which a computer program is stored that, when being executed by a computer, is configured to provide instructions to control or carry out at least the following: configuring the UE using physical uplink shared channel sub-PRB resources such that available PRBs in each subframe or narrowband are reorganized into a number of sub-PRBs; receiving by the UE a signal comprising an indication; and, based on the received indication, determining by the UE whether to use sub-PRB resource allocation.

An example of yet another embodiment of the invention disclosed herein is an apparatus, comprising means for using physical uplink shared channel sub-PRB resources such that available PRBs in each subframe or narrowband are reorganized into a number of sub-PRBs; means for receiving a signal comprising an indication; and means for, based on the received indication, determining whether to use sub-PRB resource allocation.

DETAILED DESCRIPTION OF THE DRAWINGS

The current invention puts forth the following PUSCH sub-PRB resource allocation schemes.

One bit is introduced to indicate sub-PRB allocation. For UE in RRC_CONNECTED mode, this bit would be in DCI. For UE in IDLE mode, this bit could be in RAR grant, MAC subheader (i.e. using one of the reserved bits), or MAC RAR (i.e. using the reserved bit).

If bit is set, for RRC_CONNECTED UE (i.e. UE being in a radio resource control connection) in CE Mode A, then the sub-PRB resource allocation within the narrowband (NB) is given by a new resource allocation type (RAT), which is discussed in detail herein.

If bit is set, for RRC_CONNECTED UE in CE Mode B and IDLE UE during Msg3, then the index of the first PRB within the NB to be used for sub-PRB allocation is given explicitly or implicitly or pre-defined in the specification. Explicit signaling could be via RRC configuration or SIB1/2. Implicit determination could be based on one of the following scenarios: PRB=UE ID mod 6 if all PRBs in the NB can be used; PRB=UE ID mod 5 if two contiguous PRBs in the narrowband are used; PRB=(UE ID mod 2)+4 if only PRBs 4 & 5 are allowed (as Rel-14 DCI 6-0B leaves these 2 PRBs blank in case of 2PRB allocation); PRB=PCID mod 6 if any of the PRBs in the NB may be used, which limits reuse of a PRB for sub-PRB allocation in different cells; or band-edge or band-center to help with power boosting and interference mitigation. The sub-PRB resource allocation is given by a new resource allocation type, which is discussed in more detail hereinbelow.

Another alternative for CE Mode B resource allocation is PRB based (Rel.13 and Rel.14 resource allocation) and sub-PRB based resource allocation are indicated in one DCI, e.g., without one bit to indicate the sub-PRB allocation.

Under this alternative, for RRC_CONNECTED UE in CE Mode B and IDLE UE during Msg3, the resource allocation field is extended to 4 or more bits and the index of the first PRB within the NB to be used for sub-PRB allocation is given explicitly or implicitly or pre-defined in the specification. Explicit signaling could be via RRC configuration or SIB1/2. Implicit determination could be based on one of the following scenarios: PRB=UE ID mod 6 if all PRBs in the NB can be used; PRB=(UE ID mod 2)+4 if only PRBs 4 & 5 are allowed (as Rel-14 DCI 6-0B leaves these 2 PRBs blank in case of 2PRB allocation); band-edge or band-center to help with power boosting and interference mitigation; PRB=PCID mod 6 if any of the PRBs in the NB may be used, which limits reuse of a PRB for sub-PRB allocation in different cells. The sub-PRB resource allocation is given by a new resource allocation type, which is discussed in more detail hereinbelow.

Before discussing a non-limiting example of a physical embodiment of the invention, below is a brief discussion about aspects of the current invention in more detail and how the current invention improves over the prior state of the art.

In RAN1#90bis, sub-PRB support in CE Mode A was agreed as a working assumption. As previously determined, sub-PRB allocation can improve spectral efficiency significantly even in CE Mode A. This improved in spectral efficiency was confirmed by testing of system-level performance with and without sub-PRB allocation in CE Mode A.

In RAN1#90bis, it was also agreed that rate matching is performed across a resource unit (RU) spanning multiple subframes and the RU length depends on the number of subcarriers in the sub-PRB allocation. Reusing NB-IoT design has several advantages including the ability to support single-tone transmission (note that subcarrier and tone can be used inter-changeably, so just covering both terms here, support of larger TBS values (which can result in lower higher-layer overhead as well as CRC overhead), self-decodable transmission without requiring repetitions (which can avoid some error cases), and the ability to share implementation design with NB-IoT.

With the proposal to reuse NB-IoT resource unit design principle, it can be considered whether the number of subcarriers should be the same as NB-IoT. From NB-IoT design, 6-subcarrier (or 6-tone) allocation has 2 ms resource unit, while 3-subcarrier allocation has 4 ms resource unit. This provides the same number of resource elements as 1 PRB and is a natural fit for legacy eMTC implementation design both from coding/mapping perspective as well as the total transmission time. For instance, when considering the number repetition in eMTC, the total transmission time in many cases can remain equivalent (e.g. 3-subcarrier allocation repeated 192 times would be 768 ms). If another allocation is considered, for instance a 4-subcarrier, then the resource unit will span 3 ms which may not line up well with existing possible transmission times.

With respect to using a single-subcarrier allocation, it would provide increased capacity as the system would use fewer resources to serve coverage-limited UEs. A simulation scenario of resource utilization per PRB with and without single-subcarrier transmission, with assumptions based on TR 45.820 and the number of users per PRB per cell in the case being 137K, yielded results where the average resource utilization without single-subcarrier was 65% and with single-subcarrier was 46%. However, without sub-PRB allocation, resource utilization is 100% and the system cannot support 137K users per PRB per cell.

If single-subcarrier is supported, the RU length would be 8 ms following NB-IoT design. From a resource mapping and rate matching perspective, this may not match well with 3-subcarrier and 6-subcarrier allocation as the number of available REs is not fully matched to 1 PRB. Furthermore, the resource allocation design may need to be substantially revised to support single-subcarrier in addition to 3-subcarrier and 6-subcarrier. Thus, although single-subcarrier can provide good capacity gain, the specification impact may be significant.

It has been agreed that sub-PRB feature is configured/enabled by RRC signaling but resource allocation shall be signaled by DCI. Furthermore, the DCI shall support both sub-PRB allocation and allocation of at least 1 PRB. Ideally, the DCI should be able to support all Rel-14 allocations as well as sub-PRB allocation. This would allow full scheduling flexibility and backward compatibility without requiring reconfiguration through higher-layer signaling. To support this dynamic switching, it is proposed that a bit or flag is added to the DCI to indicate sub-PRB or legacy resource allocation.

Currently, resource allocation in 6-0A and 6-0B includes an index of the narrowband and 5/3 bits to indicate the allocated PRBs within the narrowband. It would be desirable to keep the overhead the same for resource allocation when sub-PRB allocation is used. In this case, the following methods are proposed for CE Mode A and CE Mode B.

CE Mode A. The narrowband is given by $$\left\lceil \log_2 \left\lfloor \frac{N_{RB}^{UL}}{6} \right\rfloor \right\rceil$$

MSB bits. Using 3-subcarrier and 6-subcarrier allocation, 6 bits would be needed to address all possible non-overlapping sub-PRB resource allocation. This would allow full scheduling flexibility. However, almost all possible non-overlapping sub-PRB resource allocation (i.e. 32 out of 36 possible allocations) within the narrowband can be addressed using 5 bits. Thus, it is better to use 5 bits. Further improvement can be considered, for instance, by including cell-specific PRB offset to allow for some randomization or management among different cells.

CE Mode B. The narrowband is given by $$\left\lceil \log_2 \left\lfloor \frac{N_{RB}^{UL}}{6} \right\rfloor \right\rceil$$

MSB bits. To keep the same size for the resource allocation field as 6-0B, only 3 bits would be available. This is not sufficient to indicate the PRB index and allocation. Therefore, the index of the PRB within the NB to be used for sub-PRB allocation is given explicitly via higher-layer signaling or implicitly or predefined in the specification. For instance, the PRB can be indicated in the SIB, or determined based on the cell ID. Note that PRB index can also be confined with PRB 4 and 5 within the NB, which cannot be scheduled using 2 PRBs in 6-0B. A 3-bit table would then indicate the sub-PRB allocation within the PRB. In CE Mode B, resource allocation would be given by a NB index, PRB index and sub-PRB allocation within the PRB. The PRB index would be signaled via higher-layer or predefined in the specification.

Regarding the number of Resource Units, as agreed in RAN1#90bis, sub-PRB rate matching is performed across an RU spanning multiple subframes and the RU length depends on the number of subcarriers in the sub-PRB allocation. For 3-subcarrier and 6-subcarrier allocation, it is proposed to reuse the RU length from NB-IoT. Hence, the RU length would be 4 ms and 2 ms, respectively.

Can more than one RU be allocated per transport block? In NB-IoT a transport block can be mapped to {1,2,3,4,5,6,8,10} resource units. This allows TBS up to 1000 bits to be supported. However, it requires 3 bits in the DCI. If only 1 RU is used per transport block, then currently up to 504 bits can be supported using the TBS for CE Mode B. To support up to 1000 bits, 2 RUs would be needed per transport block. This would require one additional bit in the DCI as well as increased implementation complexity. However, it would be beneficial to be able to support up to 1000 bits as well as larger TBS for the same ITBS to reduce segmentation overhead. Therefore, it is proposed to support 1 and 2 resource units per TBS.

For UE in CE Mode B, maximum transmit power is always used for the PUSCH. This can remain the same with sub-PRB allocation. For UE in CE Mode A, the UE transmit power (without a simultaneous PUCCH for the serving cell) is given by the following equation:

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\} [dBm]$$

where $M_{PUSCH,c}(i)$ is the bandwidth of the PUSCH resource assignment expressed in number of resource blocks. When sub-PRB allocation is used, $M_{PUSCH,c}(i)$ can be scaled accordingly, i.e. to ½ for 6-subcarrier and ¼ for 3-subcarrier allocation. A UE in CE Mode A would use legacy power control formula with $M_{PUSCH,c}(i)=\{¼, ½\}$ for 3-subcarrier and 6-subcarrier allocation, whereas a UE in CE Mode B would always use maximum transmit power with sub-PRB allocation.

Regarding sub-PRB allocation being supported in Msg3, early data transmission during random access should be supported. Thus, for some UEs, data transmission can be completed without having to transition to connected mode. From a spectral efficiency improvement perspective, it would also be beneficial for those UEs to be able to use sub-PRB allocation. Indication of this capability can be done through the PRACH (e.g. preamble partitioning) in conjunction with request for early data transmission. Thus, sub-PRB allocation in Msg3 is also proposed.

For sub-PRB resource allocation, it is possible that sub-PRB allocation is always used if a UE indicates capability for sub-PRB transmission and the eNB indicates sub-PRB support in the cell (e.g. by PRACH partitioning). However, it may not be ideal for the eNB to schedule Msg3 using sub-PRB allocation even if it is supported (e.g. due to PRB blocking issue).

Thus, the eNB should have scheduling flexibility when deciding whether to use sub-PRB allocation. Therefore, one bit can be introduced in the RAR to indicate sub-PRB or PRB-level allocation. This could be done for instance by introducing one bit in the RAR grant itself or by reusing one of the reserved bits in the MAC PDU.

Resource allocation can be similar as described above. In CE Mode B, the narrowband index is indicated in the grant, while the PRB index within the NB to be used for sub-PRB allocation is given explicitly via higher-layer signaling or implicitly or predefined.

Figure 1:
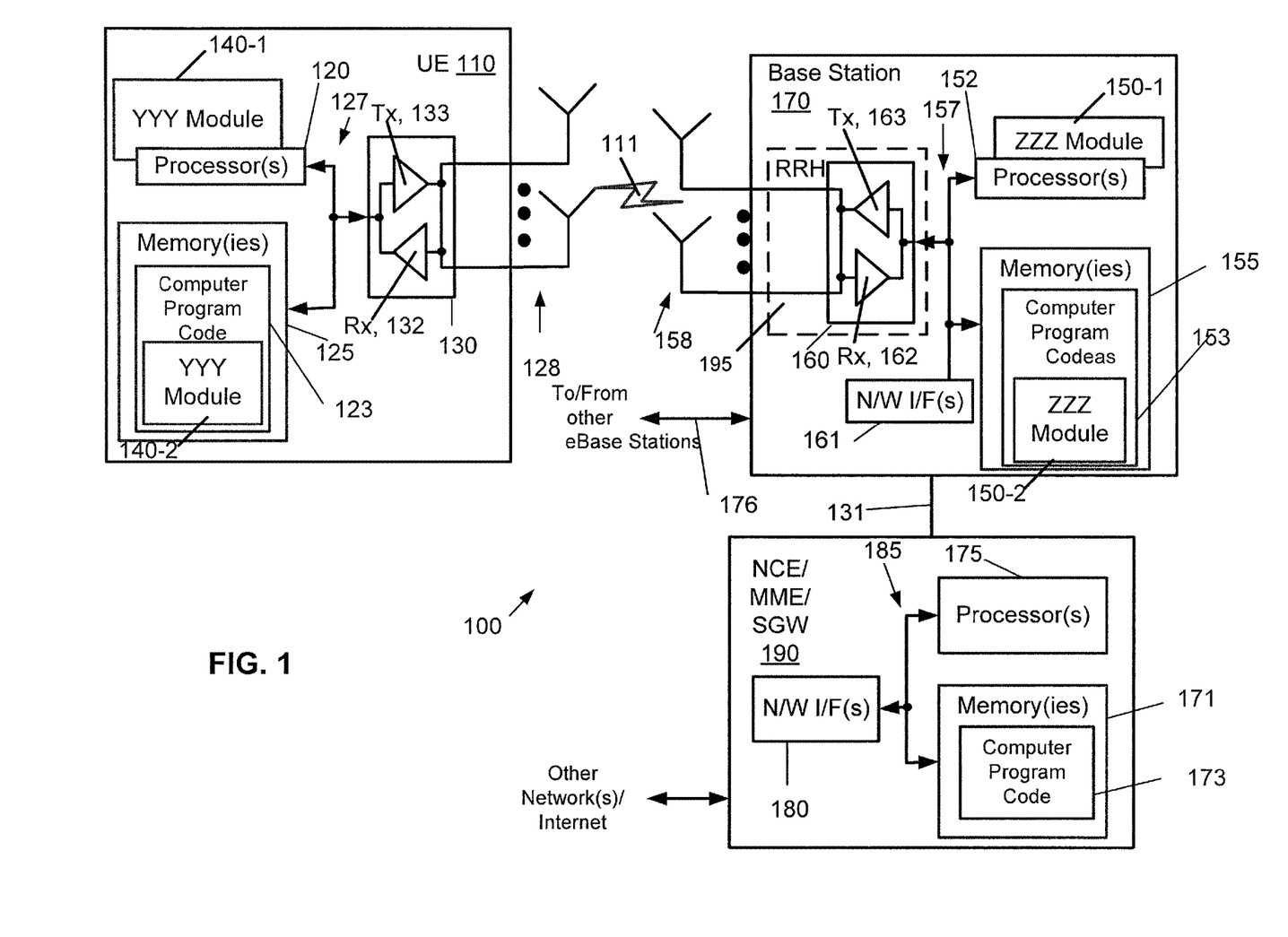
FIG. 1 is a block diagram of one possible and non-limiting exemplary system in which the exemplary embodiments may be practiced.

Before turning to a further discussion of the current invention, we turn to FIG. 1, which is a block diagram of one possible and non-limiting exemplary system in which the exemplary embodiments may be practiced.

Please note that the word "exemplary" is used herein to mean "serving as an example, instance, or illustration." Any embodiment described herein as "exemplary" is not necessarily to be construed as preferred or advantageous over other embodiments. Any and all of the embodiments described in this Detailed Description are exemplary embodiments provided to enable persons skilled in the art to make or use the invention and not to limit the scope of the invention which is defined by the claims In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. Note that the YYY module allows functionality for the usage of control resources for data transmission where any method or examples of such embodiments discussed herein can be practiced. The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The base station 170 (an evolved NodeB for LTE, long term evolution or a New Radio 5G NodeB, which would denoted as gNB) that provides access by wireless devices such as the UE 110 to the wireless network 100. The base station 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. Note that the ZZZ module allows functionality for the usage of control resources for data transmission where any method or examples of such embodiments discussed herein can be practiced. The base station 170 includes a ZZZ module 150, comprising one of or both parts 150-1 and/or 150-2, which may be implemented in a number of ways. The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the base station 170 to perform one or more of the operations as described herein. The one or more network interfaces 161 communicate over a network such as via the links 176 and 131. Two or more base stations 170 communicate using, e.g., link 176. The link 176 may be wired or wireless or both and may implement, e.g., an X2 interface.

The base station 170 schedules sub-PRB allocation to the UE 110 such that UE 110 will use sub-PRB allocation, in other words, such that the UE transmits its uplink data using a fraction of a PRB. In a non-limiting example, the procedure would be that first the base station 170 configures UE 110 to use sub-PRB resource allocation (RRC signaling, so semi-static). Next, whenever base station 170 schedules the UE 110 for UL data transmission, there is 1 bit in the DCI to tell UE 110 whether it is sub-PRB or PRB-level resource allocation (this is dynamic). Based on this bit, UE 110 will know how to interpret the resource allocation field. If bit it set, then UE 110 will transmit UL data using less than 1 PRB of frequency resource.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the base station 170 being physically in a different location from the RRH, and the one or more buses 157 could be implemented in part as fiber optic cable to connect the other elements of the base station 170 to the RRH 195.

It is noted that description herein indicates that "cells" perform functions, but it should be clear that the base station that forms the cell would perform the functions. The cell makes up part of a base station. That is, there can be multiple cells per base station. For instance, there could be three cells for a single base station carrier frequency and associated bandwidth, each cell covering one-third of a 360-degree area so that the single base station's coverage area covers an approximate oval or circle. Furthermore, each cell can correspond to a single carrier and a base station may use multiple carriers. So if there are three 120-degree cells per carrier and two carriers, then the base station has a total of 6 cells.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The base station 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization may still be implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, base station 170, and other functions as described herein.

In general, the various embodiments of the user equipment 110 can include, but are not limited to, cellular phones such as smart devices, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, internet appliances permitting wireless Internet access and browsing, tablets with wireless communication capabilities, as well as portable units or terminals that incorporate combinations of such functions. In addition, various embodiments of the user equipment include machines, communicators and categories of equipment, which are not primarily or not at all in use by human interaction.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

One possible manner to carry out embodiments described herein is with an edge cloud using a distributed computing system. An exemplary embodiment comprises a radio node connected to a server. Exemplary embodiments implementing the system allow the edge cloud server and the radio node as stand-alone apparatuses communicating with each other via a radio path or via a wired connection or they may be located in a same entity communicating via a wired connection.

The invention deals with at least two difference scenarios, denoted below as case 1 and case 2.

Case 1 involves the UE being in RRC_CONNECTED mode and configured by eNB to use sub-PRB allocation. Described below are two solutions for case 1, namely, one for a UE in CE Mode A (DCI 6-0A) and another for a UE in CE Mode B (DCI 6-0B).

For the first solution to case 1, where the UE is in CE Mode A (DCI 6-0A), one bit is introduced in DCI to indicate sub-PRB allocation.

If a bit is set, resource allocation in the narrowband is given by $$\left\lceil \log_2 \left\lfloor \frac{N_{RB}^{UL}}{6} \right\rfloor \right\rceil$$

MSB bits. The sub-PRB resource allocation within the narrowband (NB) is given by a new resource allocation type (RAT) 5.

Figure 2A:
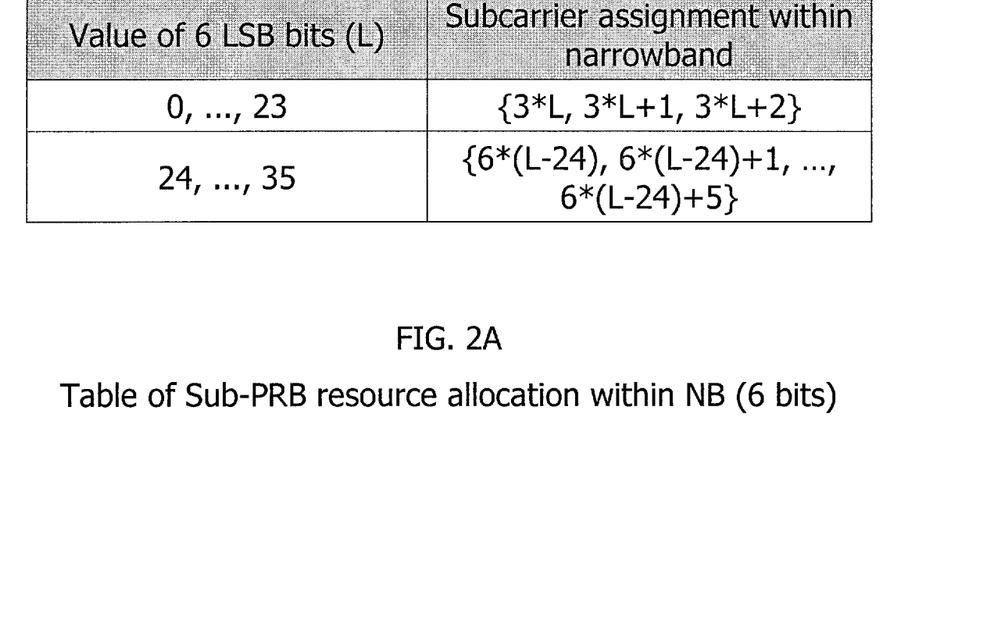
FIG. 2A presents a table of sub-PRB resource allocation within NB (6 bits) and FIG. 2B presents a table of sub-PRB resource allocation within NB with PRBoffset (5 bits)

Turning to FIG. 2A, which contains a table concerning case 1's first solution via a first method, showing resource allocation in CE Mode A being given by narrowband index and sub-PRB allocation within the narrowband. This first example of RAT 5 methods, as shown in the table of FIG. 2A, shows a method (6 bits) assuming 3-subcarrier assignment and 6-subcarrier assignment are supported.

Figure 2B:
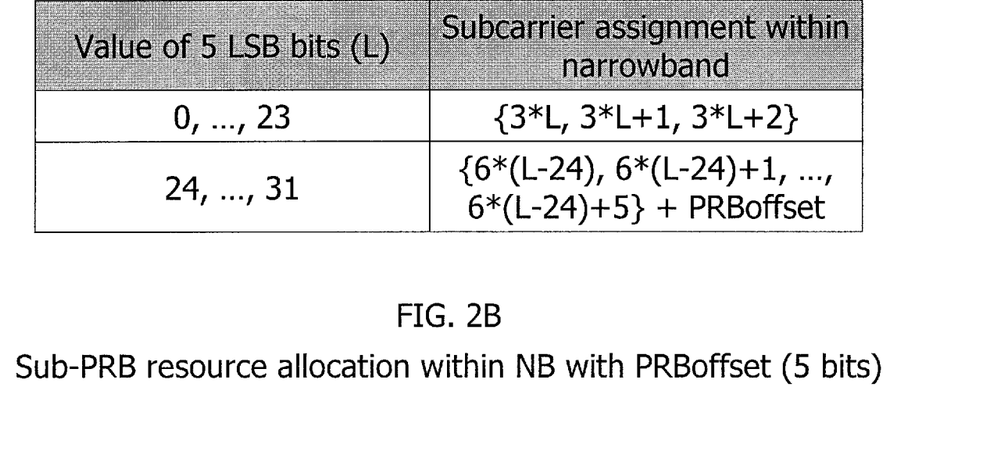

Turning to FIG. 2B, which contains a table concerning a second method for the first solution of case 1, the table therein shows Sub-PRB Resource Allocation in CE Mode A with PRBoffset. Note that the PRBoffset can be configured by higher layer signaling or predefined in the specification; the default value of PRBoffset is 0.

Otherwise, if a bit is not set, then a UE uses legacy (e.g. Rel-14) resource allocation scheme.

For the second solution to case 1, where the UE is in CE Mode B (DCI 6-0B), one bit is introduced in DCI to indicate sub-PRB allocation.

If bit is set, resource allocation in the NB is given by $$\left\lceil \log_2 \left\lfloor \frac{N_{RB}^{UL}}{6} \right\rfloor \right\rceil$$

MSB bits.

The index of the first PRB within the NB to be used for sub-PRB allocation is given explicitly or implicitly or predefined in the specification. Explicit signaling could be via RRC configuration. Implicit determination could be based on one of the following scenarios: PRB=UE ID mod 6 if all PRBs in the NB can be used; PRB=(UE ID mod 2)+4 if only PRBs 4 & 5 are allowed (as Rel-14 DCI 6-0B leaves these 2 PRBs blank in case of 2PRB allocation); band-edge or band-center to help with power boosting and interference mitigation; PRB=PCID mod 6 if any of the PRBs in the NB may be used. This limits reuse of a PRB for sub-PRB allocation in different cells.

Figure 3A:
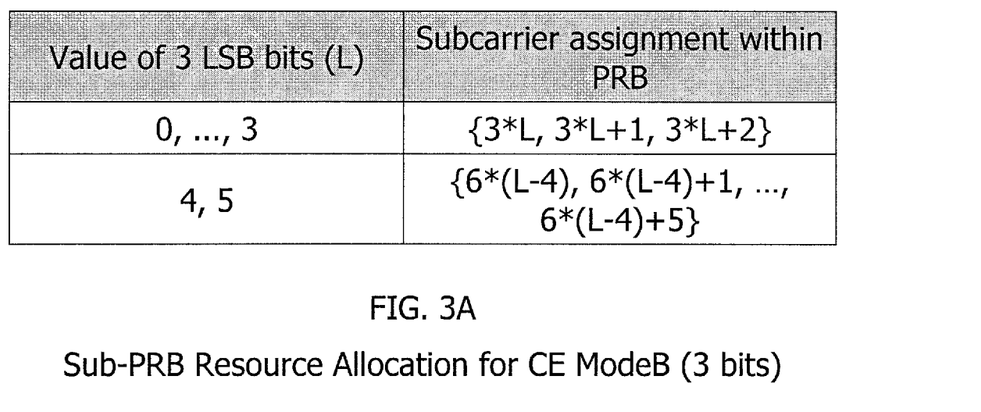
FIG. 3A presents a table of Sub-PRB Resource Allocation for CE Mode B (3 bits) and FIG. 3B illustrates sub-PRB resource allocation in CE Mode B.

FIG. 3A has a table illustrating how the resource allocation is given by a new resource allocation type as shown in the sub-PRB resource allocation for CE Mode B (3 bits), which allows 3-6-subcarrier assignments in one PRB. Alternatively, the remaining two LSB values (6 and 7) can also be utilized to allow 6-subcarrier assignments in two contiguous PRBs. In that case, the implicit determination of the index of the first PRB within the narrowband is redefined to be restricted to a maximum value of 5.

Figure 3B:
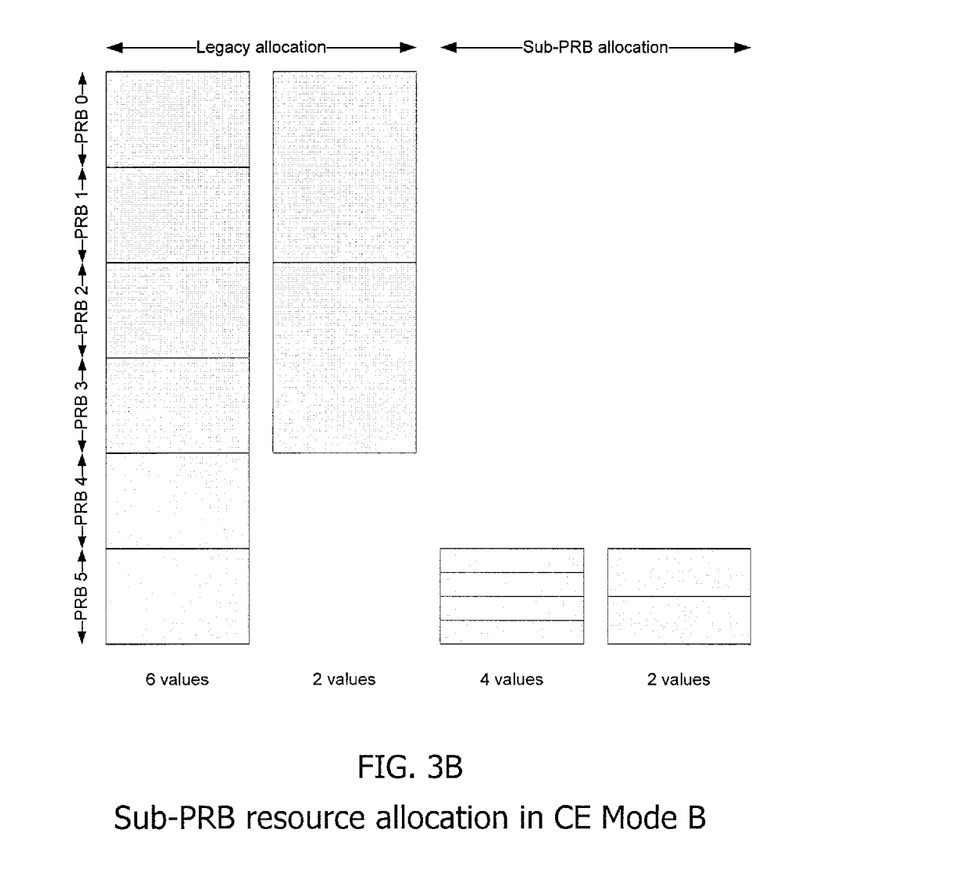

FIG. 3B, a graphical representation of sub-PRB resource allocation in CE Mode, depicts an example for resource allocation based on the table in FIG. 3A.

Otherwise, if a bit is not set, then a UE uses Rel-14 resource allocation scheme.

Case 2 is where the UE is in IDLE mode and supports sub-PRB allocation in Msg3 during random access.

One bit is introduced either in RAR grant or by using reserved field in MAC subheader (i.e. E/T/R/R/BI MAC subheader) or MAC RAR to indicate sub-PRB allocation. UE that is capable of sub-PRB transmission and has indicated to the eNB that it wishes to use sub-PRB allocation (e.g. through PRACH partitioning) will monitor the RAR for this indicator. Alternately, a different RA-RNTI could be reserved to indicate sub-PRB allocation. UE can check 2 different RA-RNTIs to see whether sub-PRB or PRB-based allocation is used.

If bit is set, the narrowband is given by the RAR grant and UE determines the index of the first PRB to be used for sub-PRB allocation explicitly or implicitly. Explicit signaling could be via SIB1/2. Implicit determination could be based on one of the following scenarios: PRB=UE ID mod 6 if all PRBs in the NB can be used; PRB=(UE ID mod 2)+4 if only PRBs 4 & 5 are allowed (as Rel-14 DCI 6-0B leaves these 2 PRBs blank in case of 2PRB allocation); band-edge or band-center to help with power boosting and interference mitigation; PRB=PCID mod 6 if any of the PRBs in the NB may be used. This limits reuse of a PRB for sub-PRB allocation in different cells. The resource allocation is given by a new resource allocation type (e.g. similar as shown in the tables in FIGS. 2A and 2B.)

Figure 4:
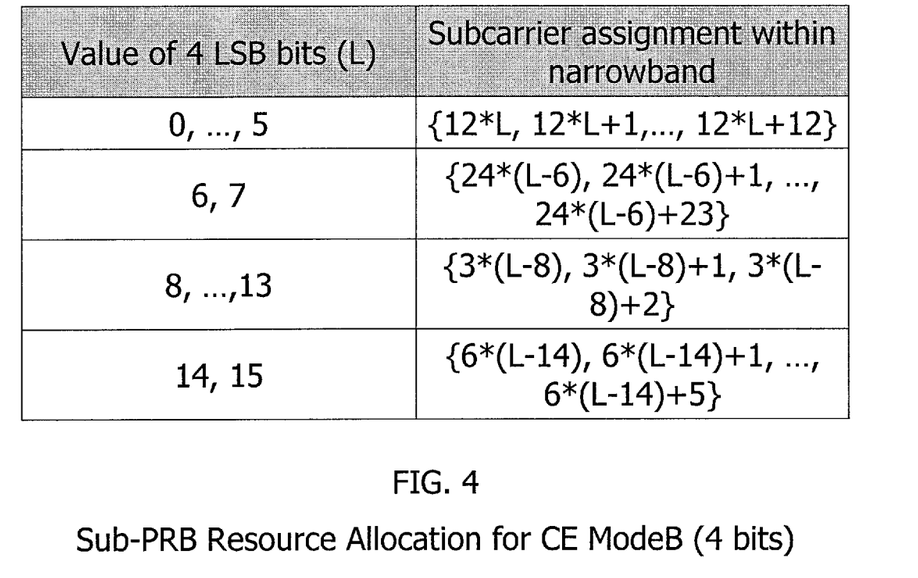
FIG. 4 presents a table of sub-PRB Resource Allocation for CE Mode B (4 bits)

Turning to FIG. 4, for another alternative resource allocation for CE Mode B, an example of an allocation is given by the sub-PRB resource allocation for CE Mode B (4 bits) table in FIG. 4.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., 104, 134, or other device) that may be any media or means that can contain, store, and/or transport the instructions for use by or in connection with an instruction execution system, apparatus, or device, such as a computer. A computer-readable storage medium does not comprise merely propagating signals.

Figure 5:
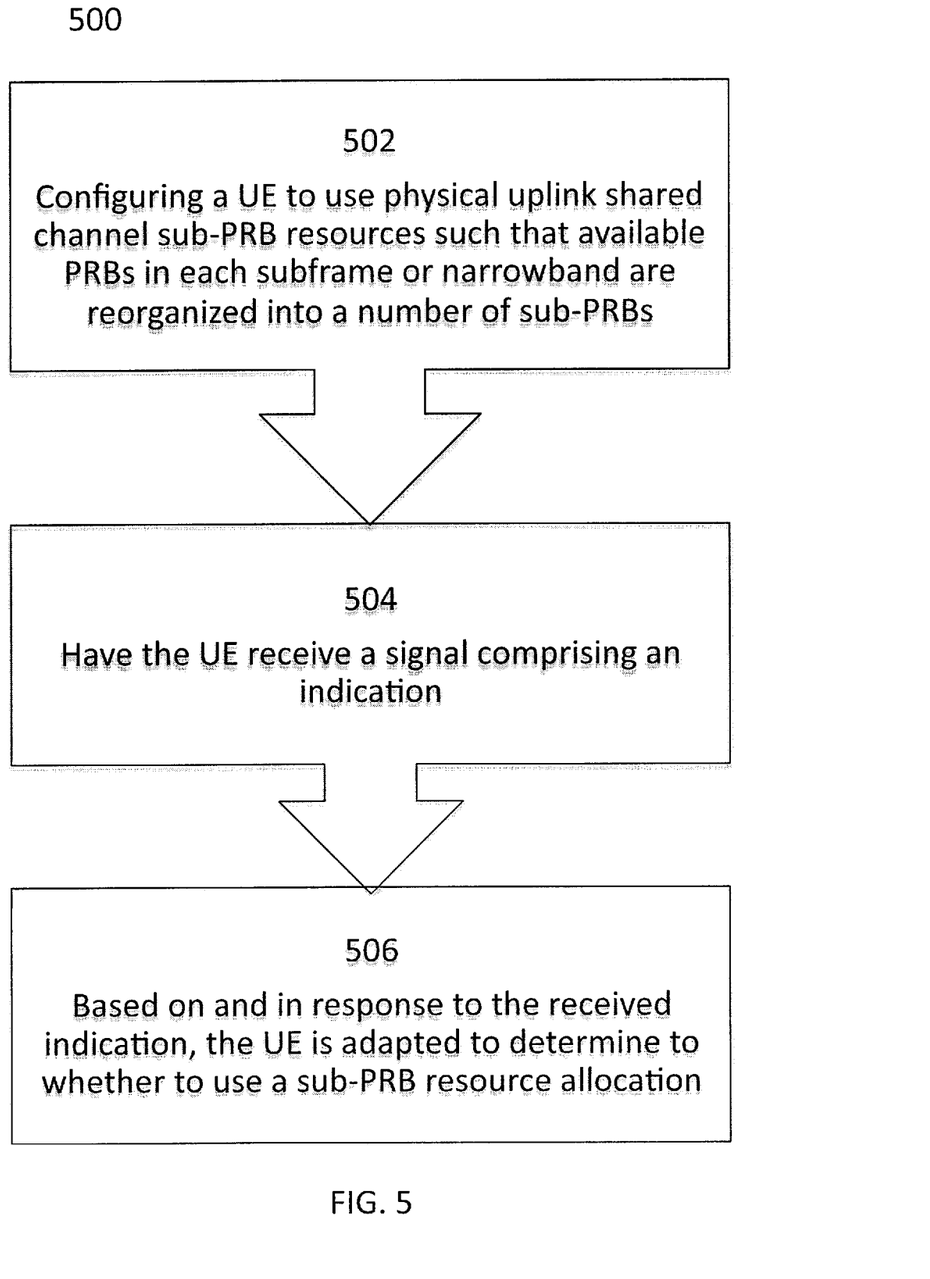
FIG. 5 is a logic flow diagram for dynamic segmentation, and illustrates the operation of an exemplary method, a result of execution of computer program instructions embodied on a computer readable memory, functions performed by logic implemented in hardware, and/or interconnected means for performing functions in accordance with exemplary embodiments.

FIG. 5 is a logic flow diagram for resource allocation for sub-physical-resource-block uplink transmission, and illustrates the operation of an exemplary method 500, a result of execution of computer program instructions embodied on a computer readable memory, functions performed by logic implemented in hardware, and/or interconnected means for performing functions in accordance with exemplary embodiments. Parts or all of method 500 could be performed in module YYY or module ZZZ as appropriate.

In step 502, a UE is previously configured to use physical uplink shared channel sub-PRB resources such that available PRBs in each subframe or narrowband are reorganized into a number of sub-PRBs. In step 504, the UE receives a signal, for example from a base station, comprising an indication. In step 506, based on and in response to the received indication, the UE is then adapted to support a sub-PRB resource allocation If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

Without in any way limiting the scope, interpretation, or application of the claims appearing below, an advantage or a technical effect of one or more of the exemplary embodiments disclosed herein is that they support all Rel-14 based allocation and provide good sub-PRB scheduling flexibility while increasing grant size by at most 1-2 bits.

An example of an embodiment of the current invention, which can be referred to as item 1, is a method that comprises receiving by a user equipment in a wireless communications system an indication, wherein the user equipment was previously configured for using physical uplink shared channel sub-PRB resources such that available PRBs in each subframe or narrowband are reorganized into a number of sub-PRBs; and determining by the UE whether to use sub-PRB resource allocation based on the received indication.

An example of a further embodiment of the current invention, which can be referred to as item 2, is the method of item 1, where the indication is of a sub-PRB resource allocation comprised in one bit, wherein the bit is set.

An example of a further embodiment of the current invention, which can be referred to as item 3, is the method of claim 1, wherein the indication is a PRB-based allocation or is a sub-PRB-based resource allocation without one bit to indicate the sub-PRB allocation. Alternatively, item 3 could be thought of as the method of item 1, wherein the indication is a PRB-based resource allocation or a PRB allocation and sub-PRB-based resource allocation or wherein the indication comprises a PRB-based resource allocation.

An example of a further embodiment of the current invention, which can be referred to as item 4, is the method of item 2, where for the UE being in a radio resource control connection, the indication is comprised in downlink control information.

An example of a further embodiment of the current invention, which can be referred to as item 5, is the method of item 2, where for the UE being in an idle mode, the indication is comprised in at least one of a random access response, a medium access control subheader, and a medium access control random access response.

An example of a further embodiment of the current invention, which can be referred to as item 6, is the method of any of items 1, 2, or 4, where, for the UE being in Coverage Enhancement Mode A, the sub-PRB resource allocation within a narrowband is given by a new resource allocation type.

An example of a further embodiment of the current invention, which can be referred to as item 7, is the method of any of items 1, 2, 4, or 6, where a subcarrier assignment within a narrowband follows a sub-PRB resource allocation table where 3-subcarrier and 6-subcarrier assignments are supported with PRB resources fully used, or follows a subset of the table or PRBs to be used for sub-PRB allocation can be implicitly or explicitly configured with a PRB offset.

An example of a further embodiment of the current invention, which can be referred to as item 8, is the method of any of items 1, 2, 4, or 6, where, for the UE being in Coverage Enhancement Mode B or for the UE in idle mode during a random access channel procedure where the UE sent an identification message to the base station (e.g., Msg3), an index of a first PRB within a narrowband to be used for sub-PRB allocation is explicitly signaled, is determined implicitly, or is pre-defined, and wherein the sub-PRB resource allocation within a narrowband is given by a new resource allocation typ.

An example of a further embodiment of the current invention, which can be referred to as item 9, is the method of items 1 or 3, where, for the UE being in Coverage Enhancement Mode B or for the UE in idle mode during a random access channel procedure where the UE sent an identification message to the base station (e.g., Msg3), an index of a first PRB within a narrowband to be used for sub-PRB allocation is explicitly signaled, is determined implicitly, or is pre-defined, and wherein the sub-PRB resource allocation within a narrowband is given by a new resource allocation type.

An example of a further embodiment of the current invention, which can be referred to as item 10, is the method of any of items 8 or 9, where the explicit signaling can be radio resource control signaling or system information.

An example of a further embodiment of the current invention, which can be referred to as item 11, is the method of any of items 8 or 9, where the implicit indication can be at least based on UE ID, Cell ID, allowed PRBs in the narrowband, mod operation.

An example of another embodiment of the present invention, which can be referred to as item 12, is an apparatus that comprises at least one processor and at least one memory including computer program code, where the at least one memory and the computer program code are configured, with the at least one processor, to cause the apparatus to perform at least the following: at least one processor; and at least one memory including computer program code, the at least one memory and the computer program code configured to, with the at least one processor, cause the apparatus to perform at least the following: receiving an indication, wherein the apparatus was previously configured for using physical uplink shared channel sub-PRB resources such that available PRBs in each subframe or narrowband are reorganized into a number of sub-PRBs; determining whether to use sub-PRB resource allocation based on the received indication.

An example of another embodiment of the present invention, which can be referred to as item 13, is the apparatus of item 12, where the indication is of a sub-PRB resource allocation comprised in one bit, where the bit is set.

An example of another embodiment of the present invention, which can be referred to as item 14 is the method of claim 12, wherein the indication is a PRB-based allocation or is a sub-PRB-based resource allocation without one bit to indicate the sub-PRB allocation. Alternatively, item 14 could be thought of as the method of item 12, wherein the indication is a PRB-based resource allocation or a PRB allocation and sub-PRB-based resource allocation or wherein the indication comprises a PRB-based resource allocation.

An example of another embodiment of the present invention, which can be referred to as item 15, is the apparatus of item 13, where for the UE being in a radio resource control connection, the indication is comprised in downlink control information.

An example of another embodiment of the present invention, which can be referred to as item 16, is the apparatus of item 13, where for the UE being in an idle mode, the indication is comprised in at least one of a random access response, a medium access control subheader, and a medium access control random access response.

An example of another embodiment of the present invention, which can be referred to as item 17, is the apparatus of any of items 12, 13, or 15, where, for the UE being in Coverage Enhancement Mode A, the sub-PRB resource allocation within a narrowband is given by a new resource allocation type.

An example of another embodiment of the present invention, which can be referred to as item 18, is the apparatus of any of items 12, 13, 15, or 17, where a subcarrier assignment within a narrowband follows a sub-PRB resource allocation table where 3-subcarrier and 6-subcarrier assignments are supported with PRB resources fully used, or follows a subset of the table or PRBs to be used for sub-PRB allocation can be implicitly or explicitly configured with a PRB offset.

An example of another embodiment of the present invention, which can be referred to as item 19, is the apparatus of any of items 12, 13, 15, or 17, where, for the UE being in Coverage Enhancement Mode B or for the UE in idle mode during a random access channel procedure where the UE sent an identification message to the base station (e.g., Msg3), an index of a first PRB within a narrowband to be used for sub-PRB allocation is explicitly signaled, is determined implicitly, or is pre-defined, and where the sub-PRB resource allocation within a narrowband is given by a new resource allocation type.

An example of another embodiment of the present invention, which can be referred to as item 20, is the apparatus of any of items 12 or 14, where, for the UE being in Coverage Enhancement Mode B or for the UE in idle mode during a random access channel procedure where the UE sent an identification message to the base station (e.g., Msg3), an index of a first PRB within a narrowband to be used for sub-PRB allocation is explicitly signaled, is determined implicitly, or is pre-defined, and where the sub-PRB resource allocation within a narrowband is given by a new resource allocation type.

An example of another embodiment of the present invention, which can be referred to as item 21, is the apparatus of any of items 19 or 20, where, the explicit signaling can be radio resource control signaling or system information.

An example of another embodiment of the present invention, which can be referred to as item 22, is the apparatus of any of items 19 or 20, where the implicit indication can be at least based on UE ID, Cell ID, allowed PRBs in the narrowband, mod operation.

An example of an additional embodiment of the instant invention, which can be referred to as item 23, is a computer program that comprises code for configuring using physical uplink shared channel sub-PRB resources such that available PRBs in each subframe or narrowband are reorganized into a number of sub-PRBs; code for receiving a signal comprising an indication; and code for, based on the received indication, determining by the UE whether to use sub-PRB resource allocation.

An example of an additional embodiment of the instant invention, which can be referred to as item 24, is the computer program according to item 23, wherein the computer program is embodied on a computer program product comprising a computer-readable medium bearing computer program code therein for use with a computer.

An example of yet another embodiment of the current invention, which can be referred to as item 25, is a non-transitory computer-readable medium encoded with instructions that, when executed by a computer, performs the method of any of items 1-11.

An example of a still further embodiment of the present invention, which can be referred to as item 26, is an apparatus, comprising means for using physical uplink shared channel sub-PRB resources such that available PRBs in each subframe or narrowband are reorganized into a number of sub-PRBs; means for receiving a signal comprising an indication; and means for, based on the received indication, determining by the UE whether to use sub-PRB resource allocation.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
   receiving with a user equipment in a wireless communications system an indication, wherein the user equipment was previously configured for using physical uplink shared channel sub-physical resource block resources such that available physical resource blocks in at least one subframe or at least one narrowband are reorganized into a number of sub-physical resource blocks, wherein the indication is configured to indicate an availability of a sub-physical resource block resource allocation, wherein the indication is configured to indicate the sub-physical resource block resource allocation, wherein the indication is comprised in one bit, wherein the bit is set, wherein for the user equipment being in an idle mode, the indication is comprised in at least one of
      a random access response grant,
      a medium access control subheader, or
      a medium access control random access response; and
   determining with the user equipment whether to use the sub-physical resource block resource allocation based on the received indication.

2. The method of claim 1, wherein the indication is a physical resource block-based allocation or is a sub-physical resource block-based resource allocation without one bit to indicate the sub-physical resource block allocation.

3. The method of claim 1, wherein for the user equipment being in a radio resource control connection, the indication is comprised in downlink control information.

4. The method of claim 1, wherein, for the user equipment being in Coverage Enhancement Mode A, the sub-physical resource block resource allocation within the at least one narrowband is given with a new resource allocation type.

5. The method according to claim 1, wherein a subcarrier assignment within the at least one narrowband
   follows a sub-physical resource block resource allocation table where 3-subcarrier and 6-subcarrier assignments are supported with physical resource block resources fully used, or
   follows a subset of the sub-physical resource block resource allocation table or
   physical resource blocks to be used for the sub-physical resource block allocation are implicitly or explicitly configured with a physical resource block offset.

6. The method according to claim 1, wherein, for the user equipment being in Coverage Enhancement Mode B or for the user equipment in idle mode during a random access channel procedure where the user equipment sent an identification message to a base station, an index of a first physical resource block within the at least one narrowband to be used for the sub-physical resource block allocation is explicitly signaled, is determined implicitly, or is pre-defined, and wherein the sub-physical resource block resource allocation within the at least one narrowband is given with a new resource allocation type.

7. The method according to claim 1, wherein, for the user equipment being in Coverage Enhancement Mode B or for the user equipment in idle mode during a random access channel procedure where the user equipment sent an identification message to the base station, an index of a first physical resource block within the at least one narrowband to be used for sub-physical resource block allocation is explicitly signaled, is determined implicitly, or is pre-defined, and wherein the sub-physical resource block resource allocation within the at least one narrowband is given with a new resource allocation type.

8. An apparatus, comprising:
   at least one processor; and
   at least one non-transitory memory including computer program code,
   the at least one memory and the computer program code configured to, with the at least one processor, cause the apparatus to perform at least the following:
      receiving an indication, wherein the apparatus was previously configured for using physical uplink shared channel sub-physical resource block resources such that available physical resource blocks in at least one subframe or at least one narrowband are reorganized into a number of sub-physical resource blocks, wherein the indication is configured to indicate an availability of a sub-physical resource block resource allocation, wherein the indication is configured to indicate a sub-physical resource block resource allocation, wherein the indication is comprised in one bit, wherein the bit is set, wherein for the apparatus being in an idle mode, the indication is comprised in at least one of
         a random access response grant,
         a medium access control subheader, or
         a medium access control random access response; and
      determining whether to use the sub-physical resource block resource allocation based on the received indication.

9. The apparatus of claim 8, wherein the indication is a physical resource block-based allocation or is a sub-physical resource block-based resource allocation without one bit to indicate the sub-physical resource block allocation.

10. The apparatus of claim 8, wherein for the apparatus being in a radio resource control connection, the indication is comprised in downlink control information.

11. The apparatus of claim 8, wherein, for the apparatus being in Coverage Enhancement Mode A, the sub-physical resource block resource allocation within the at least one narrowband is given with a new resource allocation type.

12. The apparatus according to claim 8, wherein a subcarrier assignment within the at least one narrowband
   follows a sub-physical resource block resource allocation table where 3-subcarrier and 6-subcarrier assignments are supported with physical resource block resources fully used, or
   follows a subset of the sub-physical resource block resource allocation table or
   physical resource blocks to be used for sub-physical resource block allocation are implicitly or explicitly configured with a physical resource block offset.

13. The apparatus according to claim 8, wherein, for the apparatus being in Coverage Enhancement Mode B or for the apparatus in idle mode during a random access channel procedure where the apparatus sent an identification message to a base station, an index of a first physical resource block within the at least one narrowband to be used for sub-physical resource block allocation is explicitly signaled, is determined implicitly, or is pre-defined, and wherein the sub-physical resource block resource allocation within the at least one narrowband is given with a new resource allocation type.

14. The apparatus according to claim 8, wherein, for the apparatus being in Coverage Enhancement Mode B or for the apparatus in idle mode during a random access channel procedure where the apparatus sent an identification message to the base, an index of a first physical resource block within the at least one narrowband to be used for sub-physical resource block allocation is explicitly signaled, is determined implicitly, or is pre-defined, and wherein the sub-physical resource block resource allocation within the at least one narrowband is given with a new resource allocation type.

15. A computer program embodied on a non-transitory computer-readable storage medium, comprising:

code for configuring using physical uplink shared channel sub-physical resource block resources such that available physical resource blocks in at least one subframe or at least one narrowband are reorganized into a number of sub-physical resource blocks, wherein an indication is configured to indicate an availability of a sub-physical resource block resource allocation, wherein the indication is configured to indicate the sub-physical resource block resource allocation, wherein the indication is comprised in one bit, wherein the bit is set;

code for receiving a signal comprising the indication, wherein for an idle mode, the indication is comprised in at least one of
a random access response grant,
a medium access control subheader, or
a medium access control random access response; and code for, based on the received indication, determining whether to use the sub-physical resource block resource allocation.

* * * * *